(No Model.)
L. A. ROBERTS.
BELT FASTENER.
No. 286,072. Patented Oct. 2, 1883.
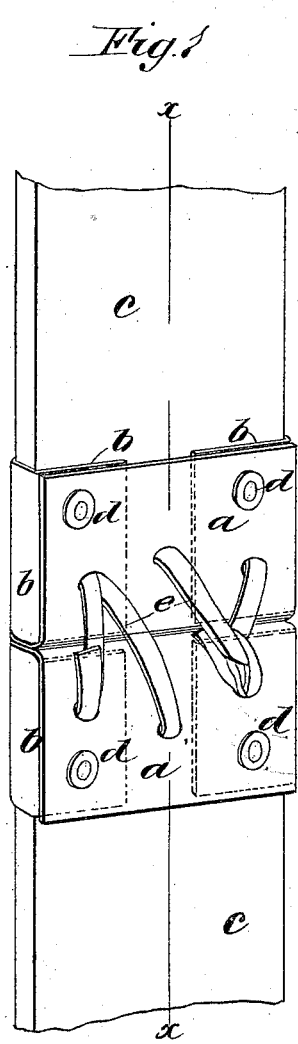
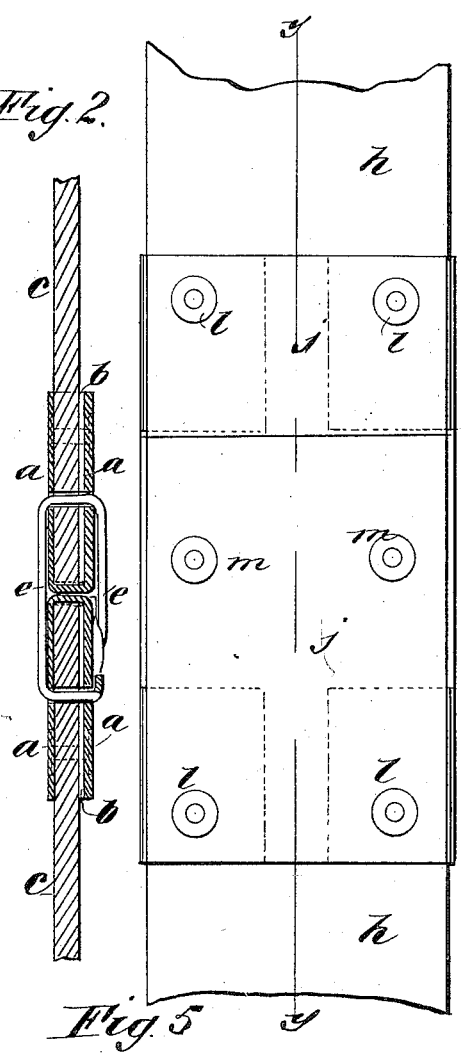
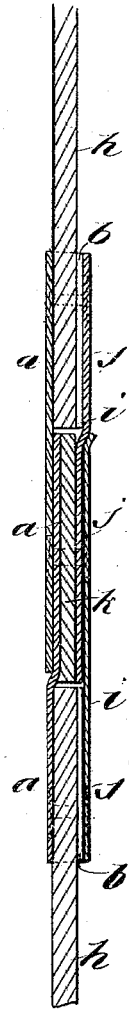
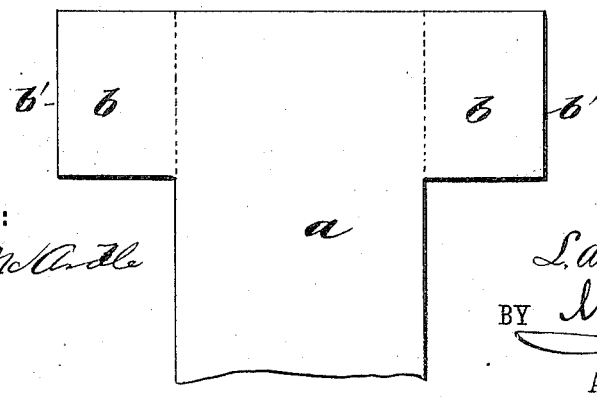
WITNESSES:
Francis McArdle
C. Sedgwick
INVENTOR:
L. A. Roberts
BY Munn & Co.
ATTORNEYS.

UNITED STATES PATENT OFFICE.

LEONIDAS A. ROBERTS, OF MONTICELLO, GEORGIA.

BELT-FASTENER.

SPECIFICATION forming part of Letters Patent No. 286,072, dated October 2, 1883.

Application filed July 24, 1883. (No model.)

*To all whom it may concern:*

Be it known that I, LEONIDAS A. ROBERTS, of Monticello, in the county of Jasper and State of Georgia, have invented a new and useful Improvement in Belt-Fasteners, of which the following is a full, clear, and exact description.

The object of my invention is to provide a simple, easily-applied, and durable fastener for the ends of belts used for the transmission of power, and one particularly adapted for joining the ends of rubber belting, which is so liable to tear or break at the fastenings under slightly excessive load on or speed of the belt.

The invention consists in a fastener of leather or like pliable material cut in T form, to be laid on and wrapped about the ends of the belt, and adapted to be fastened on the belt to make a durable joint, either by hooks, rivets, lacings, or any of the ordinary appliances commonly used, or by a combination of lacings with hooks, rivets, or other metallic fastenings, the improvement being adapted for joining many pieces together to form a belt, or simply for joining two ends of a belt, all as hereinafter fully described and claimed.

Reference is to be had to the accompanying drawings, forming a part of this specification, in which similar letters of reference indicate corresponding parts in all the figures.

Figure 1 represents the improved fastener applied for lace-joining the meeting ends of a belt. Fig. 2 is a longitudinal sectional elevation on line $x\ x$ of Fig. 1. Fig. 3 shows the improvement as adapted for joints along a belt, and with auxiliary re-enforcing-plates applied therewith as a modification. Fig. 4 is a longitudinal sectional elevation of Fig. 3 on line $y\ y$, and Fig. 5 shows the fastener partly broken away.

The belt-fastener I make in T form, with a body or stem, $a$, having side lips or flaps, $b$, which flaps may have a length equal to or more or less than one-half the length of the fastener, and the flaps $b$ may extend sidewise from the body $a$ to meet at their side edges, $b'$, at the back of the belt, or to lap thereover only enough to afford a firm hold for fastening hooks, rivets, or analogous devices.

Figs. 1 and 2 of the drawings represent the fasteners applied independently to each end of a rubber belt, $c$, by laying the head end of the body $a$ of the fastener on the face of the belt for a distance from the ends of the belt equal to the length of the side flaps, $b$, then bending the said flaps over sidewise and lapping them upon the back of the belt, and then turning over the body $a$ of the fastener and lapping it endwise of the belt over the back of the belt and the flaps $b$, whereupon the rivets $d$, or staples, hooks, or analogous fastening devices are passed through the belt and fastener, as shown, thereby firmly binding the fasteners to the ends of the rubber belt and strengthening them by the re-enforce of the "kip" leather or like tough and pliable material of the fastener, so that when the belt-lacing $e$ is passed through the belt ends and the threefold thickness of the fastener $a\ b$, and secured in any approved way, the belt-joint will be complete, firm, and quite smooth, fitting the belt for prolonged duty in heavy work and at high speed.

Figs. 3 and 4 represent the fasteners applied to joint a belt, $h$, by first laying them on the ends and faces of the belt for a distance equal to the length of flaps $b$, which flaps of both fasteners are bent over and lapped on the back or reverse side or face of the ends of the belt, leaving the overhanging body portions $a$ of the fastenings projecting from the extreme ends $i$ of the belt $h$, and so as to overlap each other at the face side of the belt, whereupon one or more flexible spacing-pieces, $k$, about equal in length to the lap of the body parts $a$, are laid on the lapped parts $a$ between the belt ends $i$, and re-enforcing auxiliary facings or layers $j$, preferably of like tough and flexible material with the fasteners $a\ b$, and of equal length therewith, are laid upon the ends of the belt $h$ at its back to overhang and lap upon each other over the spacing-pieces $k$, and the whole then secured firmly together by the rivets $l$ passed through the ends of belt $h$, the doubled fasteners $a\ b$, and the auxiliary layers or back facings $j$, and by the intermediate rivets, $m$, passing through the lapped fastener-bodies $a$, the filling-pieces $k$, and the lapped back facings $j$. By this construction the belt $h$ is re-enforced by threefold thicknesses of tough, strong material, through which the fastening rivets *l* pass, which, with the strong and flexible character of the intermediate parts secured by rivets *m*, effects a substantial joint of the belt, not likely to quickly tear away or split by any strain of use.

My improved fastener, when made of kip-leather, as preferred, will afford a firm hold for the lacings and rivets, or like devices, while permitting the latter to sink in the fasteners, thus making a practically smooth joint, permitting the travel of the belt over the belt-pulleys with minimum friction and maximum useful effect; and with the materials at hand the fasteners may readily be made and applied by unskilled labor, and when applied to joints of rubber belts make these belts quite equal to belts of leather, as I have fully demonstrated by experiment.

Having thus fully described my invention, I claim as new and desire to secure by Letters Patent—

1. In a belt-fastener, a T-shaped strengthening-strip made of flexible material, and composed of the body *a*, having side arms, *b*, at one end, as set forth.

2. The combination, in a belt-fastening, of the fastener *a b*, lapped sidewise and endwise on the ends of a belt, the rivets *d* and the lacing *e*, passed through the belt ends, and the threefold thicknesses of the fastener *a b*, substantially as shown and described.

LEONIDAS A. ROBERTS.

Witnesses:
F. M. SWANSON,
W. F. JORDAN.